(12) United States Patent
Saariluoma et al.

(10) Patent No.: US 12,725,858 B2
(45) Date of Patent: Sep. 1, 2026

(54) BATTERY LID AND BATTERY ASSEMBLY

(71) Applicant: Turun ammattikorkeakoulu Oy, Turku (FI)

(72) Inventors: Heikki Saariluoma, Tenhola (FI); Aki Piiroinen, Lieto (FI); Eero Immonen, Naantali (FI)

(73) Assignee: Turun ammattikorkeakoulu Oy, Turku (FI)

( * ) Notice: Subject to any disclaimer, the term of this patent is extended or adjusted under 35 U.S.C. 154(b) by 633 days.

(21) Appl. No.: 17/766,431

(22) PCT Filed: Oct. 5, 2020

(86) PCT No.: PCT/FI2020/050653
§ 371 (c)(1),
(2) Date: Apr. 4, 2022

(87) PCT Pub. No.: WO2022/074282
PCT Pub. Date: Apr. 14, 2022

(65) Prior Publication Data
US 2023/0155220 A1 May 18, 2023

(51) Int. Cl.
*H01M 50/15* (2021.01)
*H01M 50/103* (2021.01)
*H01M 50/342* (2021.01)
*H01M 50/543* (2021.01)
*H01M 50/627* (2021.01)

(52) U.S. Cl.
CPC ......... *H01M 50/15* (2021.01); *H01M 50/103* (2021.01); *H01M 50/3425* (2021.01); *H01M 50/627* (2021.01); *H01M 50/543* (2021.01)

(58) Field of Classification Search
None
See application file for complete search history.

(56) References Cited

U.S. PATENT DOCUMENTS

2006/0063067 A1 3/2006 Kim
2012/0177960 A1 7/2012 Tasai et al.
2014/0030561 A1 1/2014 Yoon et al.
(Continued)

FOREIGN PATENT DOCUMENTS

CN 111656554 A 9/2020
EP 1089373 A1 4/2001
(Continued)

OTHER PUBLICATIONS

European Patent Office, Supplementary European Search Report, Application No. PCT/FI202005065, Mailed Sep. 6, 2023, 15 pages.
(Continued)

*Primary Examiner* — Matthew T Martin
*Assistant Examiner* — Ankith R Sripathi
(74) *Attorney, Agent, or Firm* — Ziegler IP Law Group, LLC.

(57) ABSTRACT

The aspects of the present disclosure relate to a battery lid configured to be mounted on a housing of a battery cell to cover an opening therein. The battery lid is formed by a body enclosing a flow channel having at least one flow inlet and at least one flow outlet, the flow inlet and flow outlet being arranged in flow communication with the flow channel. The disclosed embodiments relate also to a battery cell assembly.

14 Claims, 5 Drawing Sheets

(56) References Cited

U.S. PATENT DOCUMENTS

| | | | | |
|---|---|---|---|---|
| 2014/0106204 | A1 * | 4/2014 | Tononishi | H01G 11/78 429/163 |
| 2014/0193678 | A1 | 7/2014 | Kim | |
| 2015/0037646 | A1 | 2/2015 | Wyatt et al. | |
| 2019/0081288 | A1 | 3/2019 | Oide et al. | |
| 2020/0136215 | A1 * | 4/2020 | Qiu | H01M 10/6556 |
| 2020/0161728 | A1 * | 5/2020 | Wang | H01M 10/6554 |
| 2020/0243931 | A1 | 7/2020 | Sakurai | |
| 2022/0263174 | A1 * | 8/2022 | Yu | H01M 50/244 |
| 2022/0328906 | A1 * | 10/2022 | Cho | H01M 10/613 |

FOREIGN PATENT DOCUMENTS

| | | | | |
|---|---|---|---|---|
| EP | 0981834 | A1 | 3/2003 | |
| EP | 2620993 | A1 | 7/2013 | |
| KR | 20220001227 | A * | 1/2022 | H01M 50/211 |
| WO | 9927591 | A1 | 6/1999 | |
| WO | 2019186933 | A1 | 10/2019 | |

OTHER PUBLICATIONS

Notification of Transmittal of The International Search Report and The Written Opinion of The International Searching Authority, or the Declaration, Application No. PCT/FI2020/050653, Mailed Feb. 9, 2021, 15 pages.

* cited by examiner

BATTERY LID AND BATTERY ASSEMBLY

TECHNICAL FIELD

This invention relates to battery cells and batteries that are used in applications such as electric vehicles, portable devices, and power storage, but not limited thereto. In particular, the invention relates to a battery lid which is adapted to be mounted in a battery cell housing to cover its opening. The invention relates also to a battery cell assembly.

BACKGROUND

A battery cell refers to a single anode and cathode that are separated by an electrolyte and used to store the chemical energy and then transforms the stored chemical energy into an electrical energy. The battery cells may be considered as building blocks of battery pack or battery cell assemblies, which may consist of one or more different types of battery cells, such as cylindrical or prismatic battery cells, where one battery cell typically consists of a negative anode, a positive cathode, an electrolyte, an insulator, a housing, and terminals. For example, in electric vehicles, battery packs or battery cell assemblies generally include a plurality of individual battery cells connected in series or in parallel to form a battery cell module, which may be configured in series, in parallel, or a mixture of both.

The operation of any battery cell generates heat due to the losses as current flows through the internal resistance of the battery cell whether it is being charged or discharged, for example. The thermal condition of the battery is also dependent on its environment. For example, when multiple battery cells are connected either in series or in parallel, they typically generate a large amount of heat and cause a temperature rise during battery charging and discharging. The environmental conditions to which the battery cells are exposed may also affect the temperature of each battery cell. For example, in electric vehicles, battery cells heat up during driving, when the electricity is flowing out, and during charging, when electricity is flowing in. If the battery cell malfunctions, the temperature may also rise, and a sudden gas overpressure may occur inside the battery cell. With the increase of internal pressure, it can lead to swelling of the battery cell, activation of safety mechanisms or, in the worst case, breakdown of the battery cell.

BRIEF DESCRIPTION OF THE INVENTION

An object of the present invention is to solve the above-mentioned problems and to provide a novel and innovative solution for thermal management of battery cells and battery cell assemblies.

The object of the invention is achieved by a technical solution in accordance with claim 1 in which the battery lid is formed of a body which encloses a flow channel which flow channel is provided with at least one flow inlet and at least one flow outlet, and wherein said flow inlet and flow outlet are arranged in flow communication with said flow channel. Other preferred embodiments of the invention are presented in the dependent claims.

One of the advantages of the present invention is a more even distribution of thermal energy, heat, in the battery lid between the battery terminals, and better heat transfer is provided through the surfaces and body of the battery lid than in the known solutions. By means of the invention, the individual battery cells can be cooled or heated more efficiently.

BRIEF DESCRIPTION OF THE DRAWINGS

In the following the invention is described in detail with reference to the accompanying drawings, in which.

DETAILED DESCRIPTION OF THE INVENTION

Figure 1:
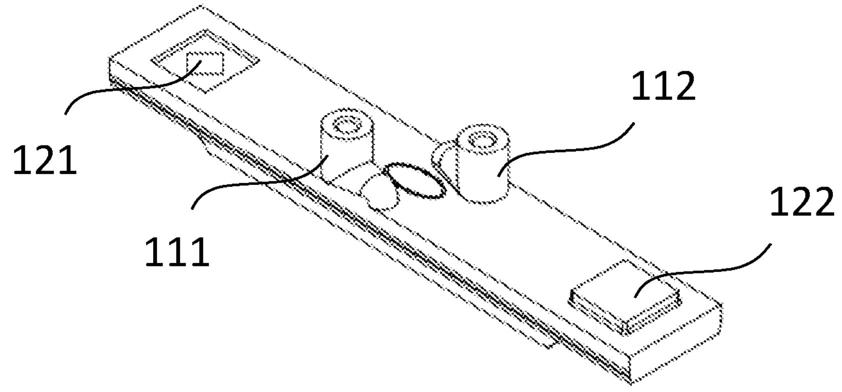
FIG. 1 is a perspective view of a battery lid according to an embodiment of the invention.

FIG. 1 shows a perspective view of a battery lid according to an embodiment of the present invention. The battery lid 100, as shown in FIG. 1, is designed, and adapted to be mounted in a battery cell housing (not shown in FIG. 1) to cover the opening therein. Said battery cell housing may be a separate part which may enclose a battery cell, and it protects the battery cell from the outside. The battery lid 100 is advantageously dimensioned according to the dimensions of the battery cell housing so that the battery lid 100 abuts its side edges tightly against the side edges of the battery cell housing, whereby the battery lid 100 and the battery cell housing can be fastened to each other, for example by welding. The side edges of the battery lid may have chamfers that make it easier to weld and attach the battery lid to the battery cell housing, i.e. to form a battery cell assembly.

In FIG. 1, the battery lid 100 is formed of a rectangular elongate body having an upper side and a lower side, and a plurality of side edges extending therebetween, said body enclosing a flow channel (not shown in FIG. 1) to be filled with a (heat transfer) fluid, and at least one flow inlet 111 and at least one flow outlet 112 to transfer said fluid. Although the body, as described herein, has a rectangular shape, other shapes may be possible, for example, circular and oval. The battery lid is provided with two terminals, a first terminal 121 (positive terminal) for a positive electrode, a cathode, and a second terminal 122 (negative terminal) for a negative electrode, an anode. The terminals 121, 122 are arranged to cover said electrodes when the battery cell is mounted in the battery cell housing and the battery lid is installed over said battery cell housing. Said terminals 121, 122 are arranged at opposite ends of the battery lid at a distance from each other. The battery lid may be electrically conductive, with at least one of the terminals being integrated into the battery lid and formed during the battery lid manufacturing process. At least one of the terminals is detachable and insulated from the battery lid.

Figure 2:
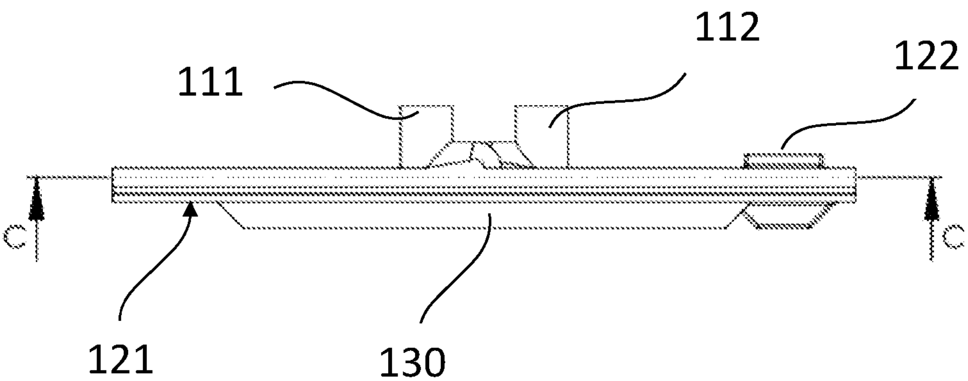
FIG. 2 is a side view of an embodiment of the invention shown in FIG. 1.

FIG. 2 is a side view of an embodiment of the invention shown in FIG. 1. The battery lid 100, on its upper side, which is the side away from the battery cell to be covered, has a flow inlet 111 and a flow outlet 112 which are parallel and located in the central region of the battery lid 100, and between said terminals 121, 122. The flow inlet and a flow outlet are perpendicular to the planar surface of the upper side of the battery lid. The battery lid 100, on its lower side, which is the side facing the battery cell to be covered (opposite the upper side), has a plurality of heat transfer fins 130, to allow improved heat transfer between the lower side and the upper side of the battery lid. Said heat transfer fins 130 extends along the planar surface of the lower side of the battery lid 100. They 130 are preferably located in and limited to the central region which is at a distance from the plurality of side edges of the battery lids. The surrounding regions, on the lower side of the battery lid, which extends from the side edges of the battery lid 100 towards the central region are without heat transfer fins 130.

It should be noted herein that the shape and configuration of the fins 130 need to be shaped according to the specifications of the battery cell and the battery cell housing. The fins 130 can thus be assumed to follow the shape of the battery cell jelly roll. Because the position and configuration of the jelly roll may vary depending on the structure of the battery cell, the design and configuration of the fins 130 on the battery lid may also vary accordingly. The purpose of the fins is to exchange heat in a three-dimensional shape on the lower side of the battery lid 100.

Figure 3:
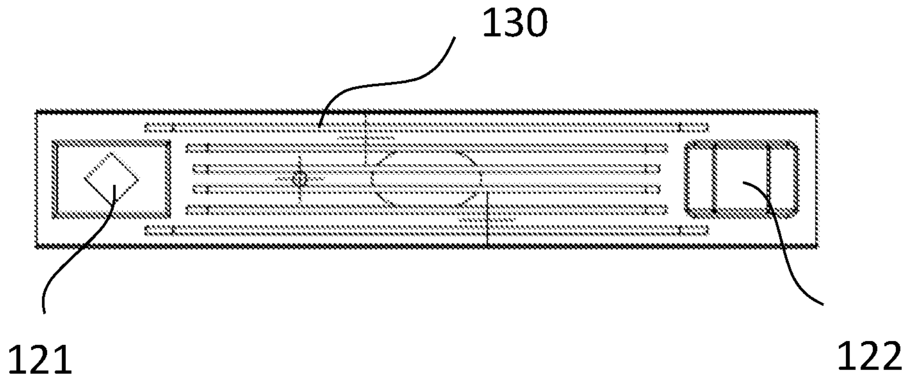
FIG. 3 is a bottom view of an embodiment of the invention shown in FIG. 1.

FIG. 3 is a bottom view of the battery lid shown in FIG. 1. The battery lid 100, on its lower side, has a plurality of parallel and spaced-apart heat transfer fins 130, to transfer heat received by them, which extend along the surface of the lower side between the first terminal 121 and the second terminal 122. Said plurality of heat transfer fins 130 are arranged in the central region and spaced from the plurality of side edges of the battery lid 100.

Figure 4:
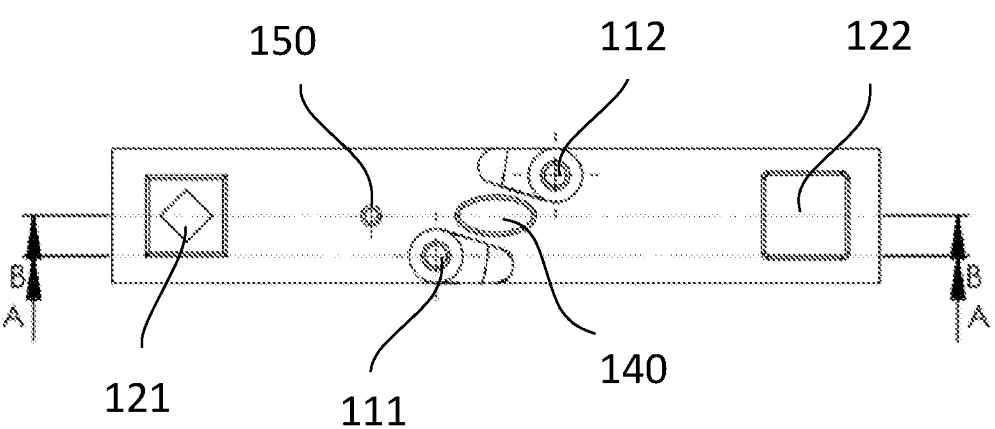
FIG. 4 is a top view of an embodiment of the invention shown in FIG. 1.

FIG. 4 is a top view of an embodiment of the invention shown in FIG. 1. The battery lid 100, on its upper side, has a first terminal 121, having a rectangular form and embedded in the planar surface of the battery lid 100, and a second terminal 122, which is rectangular and protrudes from the planar surface of battery lid 100. Said terminals 121, 122 are located at opposite ends of the battery lid and spaced from the plurality of side edges of the battery lid and surrounded by the planar surface of the battery lid. A shape other than rectangular may also be possible for the shape of the terminal, for example circular. Between said terminals 121, 122 there is a flow inlet 111 and a flow outlet 112, and between the flow inlet and the flow outlet there is a pressure vent 140 being integrated to the battery lid. The battery lid is further provided with a fill port 150. The fill port 150 has an opening extending into the flow channel (not shown in FIG. 4) inside the battery lid 100. The fill port 150 can further be provided with a self-tapping screw or, for example, a washer that covers the opening of the fill port as needed.

Figure 5:
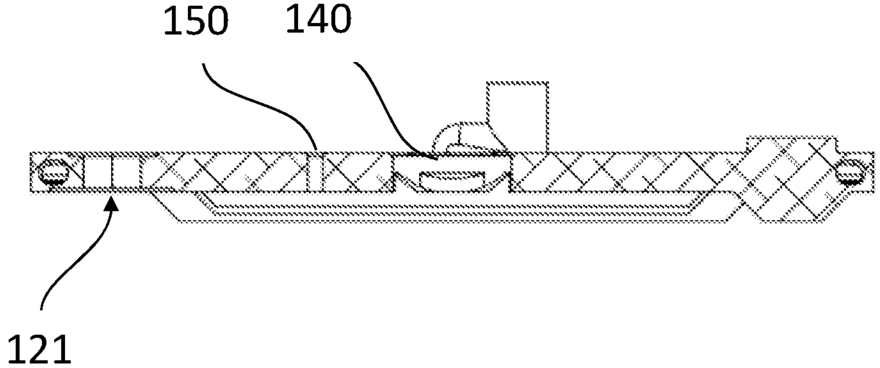
FIG. 5 is a cross-sectional view of an embodiment of the invention shown in FIG. 4 along the line B-B.

FIG. 5 is a cross-sectional view of an embodiment of the invention shown in FIG. 4 along the line B-B. The first terminal 121 is provided with a through hole between the upper side and the lower side of the battery lid 100. The fill port 150, having a through hole opening therein, is arranged between the first terminal 121 and the pressure vent 140. The pressure vent 140, on the upper side of the battery lid 100, is arranged between the flow inlet and flow outlet, and is formed of the same material than the battery lid. The pressure vent 140 has a predetermined breaking region of a reduced material thickness. The material thickness in the breaking region is preferably less than in the surrounding region, thereby allowing the breaking region to rupture at a predetermined pressure threshold with the increase of internal pressure of the battery cell housing to be covered by the battery lid.

Figure 6:
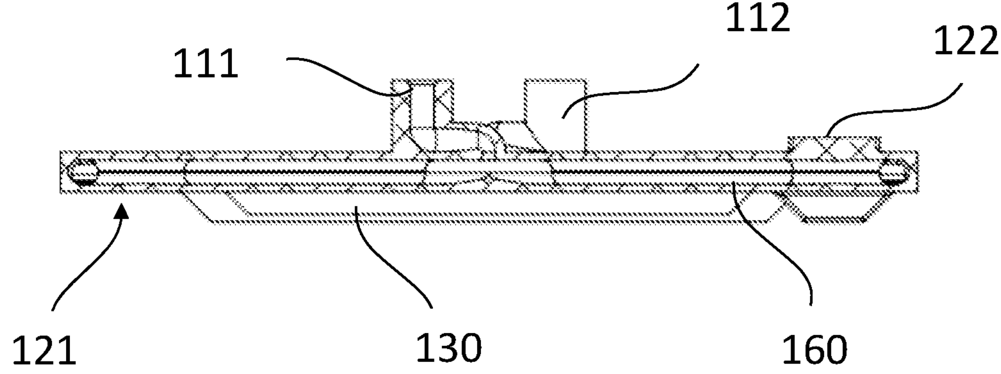
FIG. 6 is a cross-sectional view of an embodiment of the invention shown in FIG. 4 along the line A-A.

FIG. 6 is a cross-sectional view of an embodiment of the invention shown in FIG. 4 along the line A-A. The battery lid 100 is formed of an elongated body having an planar upper side and a planar lower side, and a plurality of side edges that extend upwardly between the upper side and the lower side, thereby enclosing a flow channel 160 therebetween. The flow channel 160 is arranged such that it extends continuously between the first terminal 121 and second terminal 122 around. The battery lid, on the upper side, has a flow inlet 111 and a flow outlet 112, each 111, 112 having at least one vertical flow conduct portion and at least one horizontal flow conduct portion through which the flow inlet and flow outlet are in fluid communication with said flow channel 160.

Figure 7:
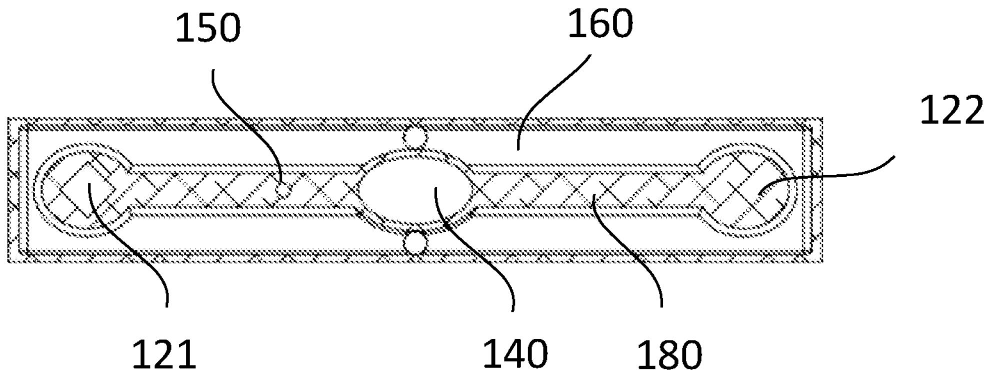
FIG. 7 is a cross-sectional view of an embodiment of the invention shown in FIG. 2 along the line C-C.

FIG. 7 is a cross-sectional view of an embodiment of the invention shown in FIG. 2 along the line C-C. The flow channel 160 extends inside the battery lid 100 between a plurality of side edges and is divided into two halves by a partition wall 180 having both terminals 121, 122, a pressure vent 140, and a fill port 150 arranged therein. The flow channel 160 is shaped to surround both terminals 121, 122. The partition wall 180 that insulates both terminals 121, 122 from the flow channel in an airtight and watertight manner forms an island within the flow channel 160. The terminals 121, 122 are electrically and hermetically separated from the flow channel. Both halves of the flow channel 160 have a variable flow channel width along the length of the battery lid 100.

Figure 8A:
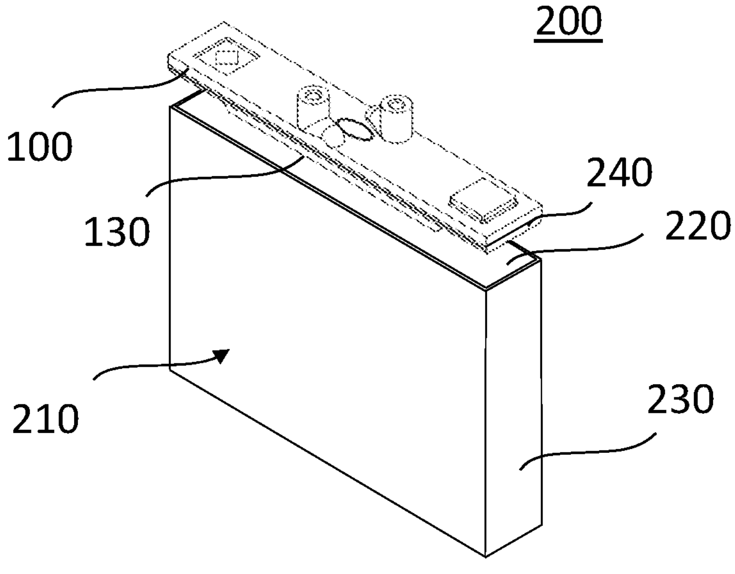
FIG. 8A is an exploded view of a battery cell assembly according to an embodiment of the invention.
Figure 8B:
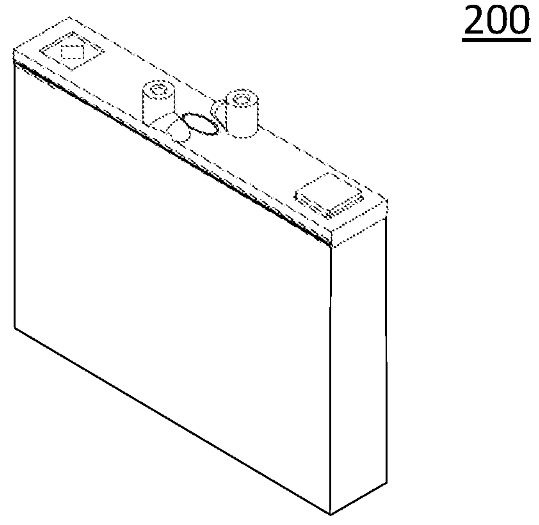
FIG. 8B is a perspective view of a battery cell assembly according to an embodiment of the invention.

FIGS. 8A and 8B illustrate a battery cell assembly 200 which comprises a battery lid 100 and a battery cell housing 210. The battery cell assembly 200 may also comprise a battery cell (not shown in FIGS. 8A and 8B) which may be arranged inside the battery cell housing 210. FIG. 8A shows a situation in which the battery lid 100 is spaced from the battery cell housing 210 above the opening 220 therein. In this example, the battery cell housing 210 is formed of a rectangular and upwardly opening container having a bottom and a plurality of side walls 230 extending perpendicularly upward from the edges of the bottom so that the side walls and bottom define a space for a battery cell.

When the battery lid 100 is installed, the lower side of the battery lid 100 with a plurality of fins 130 faces the opening 220 of the battery cell housing 210. The battery lid 100 is mounted in the battery cell housing 210 so that the plurality of fins 130 on the battery lid 100 protrude into the inside of the battery cell housing. The side edges of the battery lid 100 protrude against the edges of the opening 220 in the battery cell housing 210, and when installed, the side walls 230 of the battery cell housing 210 enclose the fins 130 in the battery lid. When installed in place above the opening 220, the battery lid 100 completely covers the opening of the battery cell housing.

The battery lid 100 is preferably dimensioned according to the size of the battery cell housing to which it is installed so that the battery lid 100 protrudes tightly from its side edges against the side edges of the battery cell housing. This makes it easier to attach the battery lid 100 and the battery cell housing, for example by welding. When installed, small chamfers 240 on the side edges of the battery lid, on the lower side of it, facilitate welding and attachment of the battery lid to the battery cell housing, and allow the interface between the battery cell housing and the battery lid to be sealed.

The battery lid according to an embodiment of the present invention may be manufactured by additive manufacturing. It reduces time to get a product, i.e. the battery lid, and emancipate many constraints that are not possible with conventional production methods, such extrusion or injection molding. For example, with additive manufacturing, it is possible to print complex geometric shapes of the battery lid, such as thermal fins, and to create a single-piece battery lid, and interlocking parts for the battery lid that require no assembly, if the battery lid is manufactured from separate parts. It is also possible to produce single objects, in small quantities, at low cost and fast delivery. Additive manufacturing also helps in the reduction of production-related material loss. Additive manufacturing may also produce different objects without creating specific tooling or even using several tools. Additive manufacturing helps increasing flexibility in the production flow and helps reducing industrial expenses. Since there is no need to build a dedicated production line, it helps also to significantly save time: additive manufacturing enables to innovate faster and mechanize faster.

Although the battery lid 100 is designed to be manufactured by an additive manufacturing method, it may be possible to manufacture the battery lid also by other manufacturing methods, for example, an injection molding method, an extrusion method, or die casting, or any combination thereof. The materials from which the battery lid may be manufactured are not limited only to those that are suitable for the additive manufacturing. The battery lid may also be made of other materials which are suitable for the manufacturing process used, such as plastic or metals, for example copper or aluminum, or, for example, carbon-based materials, such as graphite or pyrolytic graphite, or any combination thereof.

The battery lid, as described above, can be implemented in many alternative ways. For example, the shape of the battery lid can be designed in a different shape than the rectangle. In addition, the said fins on the battery lid can also be configured in many alternative ways. For example, said fins may extend through the lower side of the battery lid to the inner side of the battery lid, inside the flow channel, which may further increase the heat transfer surface area and enhance heat transfer characteristics of said battery lid. For example, the orientation of the fins relative to the battery lid and their dimensions may be implemented in different ways, other than those set forth above, which are technically feasible to a person skilled in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A battery lid configured to be mounted on a housing of a battery cell to cover an opening of said housing, wherein the battery lid is formed by a body enclosing a flow channel and defining at least one flow inlet and at least one flow outlet on an upper side of the body, said at least one flow inlet and said at least one flow outlet being arranged in flow communication with said flow channel, wherein said battery lid is provided with a plurality of fins, wherein the battery lid is provided with a first terminal and a second terminal, the flow channel extending continuously between and around the first terminal and the second terminal, wherein said at least one flow inlet and said at least one flow outlet each have at least one vertical flow conduct portion and at least one horizontal flow conduct portion through which said at least one flow inlet and said at least one flow outlet are in fluid communication with the flow channel, and wherein each of the flow channel, the at least one flow inlet, the at least one flow outlet, the at least one vertical flow conduct portion, and the at least one horizontal flow conduct portion is disposed in the battery lid.

2. The battery lid according to claim 1, wherein the second terminal is an integral part of the battery lid, without being provided with a through hole.

3. The battery lid according to claim 1, wherein at least one of said terminals is provided with a through hole.

4. The battery lid according to claim 1, wherein said flow channel is at least partially divided by at least one partition wall arranged in said flow channel.

5. A battery cell assembly comprising a battery cell and a battery cell housing, wherein the battery cell assembly is provided with a battery lid adapted to be mounted on the housing to cover an opening of the housing according to claim 1.

6. The battery lid according to claim 1, wherein the plurality of fins is on a lower side of the body.

7. A battery lid configured to be mounted on a housing of a battery cell to cover an opening of said housing, wherein the battery lid is formed by a body enclosing a flow channel and defining at least one flow inlet and at least one flow outlet on an upper side of the body, said at least one flow inlet and said at least one flow outlet being arranged in flow communication with said flow channel, wherein the battery lid is provided with a first terminal and a second terminal, the flow channel extending continuously between and around the first terminal and the second terminal, wherein said at least one flow inlet and said at least one flow outlet each have at least one vertical flow conduct portion and at least one horizontal flow conduct portion through which said at least one flow inlet and said at least one flow outlet are in fluid communication with the flow channel, and wherein each of the flow channel, the at least one flow inlet, the at least one flow outlet, the at least one vertical flow conduct portion, and the at least one horizontal flow conduct portion is disposed in the battery lid.

8. The battery lid according to claim 1, wherein each of the flow channel, the at least one vertical flow conduct portion, and the at least one horizontal flow conduct portion of the at least one flow inlet or the at least one flow outlet is integrally formed as part of the battery lid.

9. The battery lid according to claim 7, further comprising a plurality of fins integrally formed with a lower side of the body.

10. The battery lid according to claim 1, wherein the flow channel is formed as an internal passage of the lid body, and wherein each of the at least one flow inlet and the at least one flow outlet includes a vertical through-opening that opens at an upper surface of the lid body.

11. The battery lid according to claim 7, wherein the flow channel is formed as an internal passage of the lid body, and wherein each of the at least one flow inlet and the at least one flow outlet includes a vertical through-opening that opens at an upper surface of the lid body.

12. The battery lid according to claim 1, wherein the flow channel, the at least one vertical flow conduct portion and the at least one horizontal flow conduct portion of the at least one flow inlet or the at least one flow outlet are formed solely by cavities and walls of the lid body.

13. The battery lid according to claim 7, wherein the flow channel, the at least one vertical flow conduct portion and the at least one horizontal flow conduct portion of the at least one flow inlet or the at least one flow outlet are formed solely by cavities and walls of the lid body.

14. The battery lid according to claim 4, wherein the at least one partition wall is integrally formed with the lid body.

* * * * *